United States Patent
Hayashi

[11] Patent Number: 4,891,997
[45] Date of Patent: Jan. 9, 1990

[54] DYNAMICALLY TUNED GYRO

[75] Inventor: Sokichi Hayashi, Iida, Japan

[73] Assignee: Tamagawa Seiki Kabushiki Kaisha, Tokyo, Japan

[21] Appl. No.: 224,900

[22] Filed: Jul. 27, 1988

[30] Foreign Application Priority Data

| Oct. 8, 1987 | [JP] | Japan | 62-252498 |
| Oct. 8, 1987 | [JP] | Japan | 62-153327 |
| Oct. 14, 1987 | [JP] | Japan | 62-156136 |

[51] Int. Cl.⁴ ............... G01C 19/08; G01C 19/28; G01C 19/30
[52] U.S. Cl. ................... 74/5.46; 74/5 F; 74/5.6 E; 74/5.7
[58] Field of Search .......... 74/5 F, 5.7, 5.46, 5.6 E, 74/5 R, 573 R

[56] References Cited

U.S. PATENT DOCUMENTS

| 2,852,943 | 9/1958 | Sedgfield | 74/5.7 |
| 2,855,781 | 10/1958 | Alburger | 74/5 F |
| 3,125,886 | 3/1964 | Lassen et al. | 74/5.6 E |
| 3,176,523 | 4/1965 | Amlie et al. | 74/5.6 |
| 3,264,880 | 8/1966 | Fischel | 74/5 F |
| 3,490,297 | 1/1970 | Brodersen | 74/5.46 |
| 3,540,289 | 11/1970 | Ivers | 74/5.6 E X |
| 4,061,043 | 12/1977 | Stiles | 74/5 F X |
| 4,326,428 | 4/1982 | Bostwick et al. | 74/5 F |
| 4,498,340 | 2/1985 | Duncan | 74/5 F X |
| 4,528,864 | 7/1985 | Craig | 74/5 F X |
| 4,633,722 | 1/1987 | Beardmore et al. | 74/5 F X |

FOREIGN PATENT DOCUMENTS

| 60-237313 | 11/1985 | Japan . |
| 62-129715 | 6/1987 | Japan . |
| 62-162618 | 10/1987 | Japan . |

Primary Examiner—Rodney H. Bonck
Attorney, Agent, or Firm—Brooks Haidt Haffner & Delahunty

[57] ABSTRACT

A dynamically tuned gyro is disclosed in which a gyro rotor is mounted on an rotor shaft of a spin motor through the medium of a hinge unit. The rotor shaft is in the form of a hollow hysteresis ring mounted rotatably by the intermediary of a pair of bearings, while the gyro rotor supported by the hinge unit is disposed within the hollow inside space of the hysteresis ring.

6 Claims, 3 Drawing Sheets (A-A CROSS SECTION)

(B-B CROSS SECTION)

(C-C CROSS SECTION)

DYNAMICALLY TUNED GYRO

BACKGROUND OF THE INVENTION

This invention relates to a dynamically tuned gyro. More particularly, it relates to a dynamically tuned gyro in which a rotary shaft of a spin motor and a rotor are combined into one unit to reduce the number of component parts and to simplify the structure and in which the device in its entirety is in the form of an axially elongated column to provide for a more stabilized gyro operation.

Various constructions of the dynamically tuned gyro are known in the art, as typified by the construction shown in FIG. 3 of the Japanese Patent Publication KOKAI No. 60-237313. Another proposal for the construction of a dynamically tuned gyro is shown in FIG. 4 of my Japanese laid open application No. 62-162618 published Oct. 16, 1987 and is shown in FIG. 1 of this application.

Referring to FIG. 1, the numeral 1 designates a casing having a cross section in the shape of an inverted letter U. A frame member 3, having a pair of ball bearings 2, is mounted by a press fit on an inner wall 1a of the casing 1.

A stator 4a having a stator winding 4 is fixedly mounted to an inner wall 3a of the frame member 3. A rotor shaft 5 is secured for rotation to an inner ring 2a of each of the bearings 2.

The frame member 3 is secured to an outer ring 2b of each of the bearings 2. An annular hysteresis ring 7 is secured to the outer periphery of an end cap 6 which is secured to the lower end 5b of the rotor shaft 5 and to the inner bearing rings 2a, and which as a whole is cup-shape. The end cap 6 and the hysteresis ring 7 make up a motor rotor 8, while the stator 4a and the motor rotor 8 make up a spin motor 9.

A gyro rotor 13 is secured to the upper portion of the rotor shaft 5 by means of a hinge unit 12 formed by a gimbal 10 and a spring member 11. This gyro rotor 13 is constituted by a ring-shaped member having a cross section substantially in the form of a letter U, while a ring magnet 14 is secured to the inner wall of the gyro rotor 13.

A disk-shaped stop 21 is secured to the upper end of the rotor shaft 5 in such a manner that the gyro rotor 13 will abut on the periphery of the stop 21 when the gyro rotor is in an inclined position.

A sensor ring 15 is secured to the lower end of the gyro rotor 13, while a sensor coil 16 is mounted upright on the frame member 3, facing the sensor ring 15.

A torquer coil 17 is mounted on the upper surface of the frame member 3. The torquer coil 17 is mounted upright so that the foremost part of the torquer coil is disposed within the space of the gyro rotor 13 for facing the ring magnet 14.

A terminal 20 is mounted by means of an insulator 19 in a terminal plate 18 secured to the lower end of the casing 1.

The dynamically tuned gyro described above operates in the following manner.

When the spin motor 9 is actuated in the state of FIG. 1, the rotary shaft 5 is driven into a high-speed rotary movement, such that the gyro rotor 13 is driven into a high-speed rotary movement via hinge unit 12.

In the above state, when the gyro rotor 13 is in a tilted state, this state is sensed by the sensor coil 16, so that a required amount of control current is induced in the torquer coil 17, such that a force proportionate to the product of the control current in the torquer coil 17 and the magnetic flux in the gyro rotor 13 and ring magnet 14 is induced to effect positional control of the gyro rotor 13.

The dynamically tuned gyro described above presents the following disadvantages.

In my prior construction, the spin motor 9 adapted for causing the rotation of the rotary shaft 5 is comprised of the frame member 3, end cap 6, hysteresis ring 7 and the stator 4a arranged coaxially about the rotor shaft 5, and the casing 1 is mounted by a press fit to the radially outer wall of the frame member 3. Therefore, the gyro rotor structure is complicated and the outside diameter of the rotor is increased so that it becomes more difficult to obtain an axially elongated gyro rotor structure.

Also, the rotor shaft is of the cantilevered type, such that sufficient stability of the rotor shaft cannot be achieved.

In addition, the gyro rotor 13 itself has a U-shaped cross section, so that the radial size of the rotor cannot be reduced.

OBJECT AND SUMMARY OF THE INVENTION

In view of the above described inconveniences of the, it is a principal object of the present invention to provide a dynamically tuned gyro in which a rotor shaft of a spin motor and a rotor are combined into one component member to reduce the number of the component parts and to simplify the structure and in which the overall device is in the form of an axially elongated column to provide more stabilized gyro rotor operation.

In accordance with the present invention, there is provided a dynamically tuned gyro in which a gyro rotor is mounted on a rotor shaft of a spin motor through the medium of a hinge unit, wherein the improvement resides in that the rotor shaft is formed as a hollow hysteresis ring mounted rotatably by the intermediary of a pair of bearings, and in that the gyro rotor supported by the hinge unit is provided in the hollow inside space of the hysteresis ring.

In the dynamically tuned gyro according to the present invention, the hysteresis ring constituting the spin motor rotor is itself designed as a hollow member and used as a rotor shaft, so that the rotor construction is not complex in a manner distinct from the FIG. 1 system. In addition, the gyro rotor and the hinge unit are provided inside the hollow hysteresis ring which is also used as the rotor shaft, so that the device can be reduced in diameter and be of an axially elongated form to provide for more stabilized gyro operation.

The gap provided between the outer periphery of the gyro rotor and the inner periphery of the hollow hysteresis ring permits tilting of the gyro rotor while the radially inner wall of the hysteresis ring provides a stop in the event of tilt of the gyro rotor so that there is no necessity for providing a separate stop member.

In short, the following advantages may be obtained in the dynamically tuned gyro of the present invention.

(a) The hollow hysteresis ring itself acts as a rotor and is directly connected to the gyro rotor so that the spin motor construction may be simplified and an elongated structure with a reduced diameter may be obtained.

(b) The bearings are provided on both sides of the hollow hysteresis ring and the gyro rotor, the bearings are not affected by load fluctuations such as are encountered in the cantilevered device of FIG. 1. A gas bearing may be adapted in place of the ball bearing for providing high-speed rotation of the gyro rotor and improving the performance of the dynamically tuned gyro.

(c) The sensor coil and the torquer coil are not provided in proximity to each other as in the device of FIG. 1 but are separated from each other so that magnetic interference between these coils can be avoided to provide for more stabilized gyro operation.

(d) The ring magnets provided in a facing relation to the torquer coil are magnetized along the axial direction instead of in the radial direction as in the device of FIG. 1 so that a higher magnetizing force can be obtained by a simpler method of magnetization. Thus a larger torque can be produced by a smaller current and heat evolution in the torquer coil can be minimized.

(e) The end part of the casing is exposed on removal of the lid provided thereat to permit facilitated inspection and maintenance of the inside structure.

(f) A threaded member having a predetermined mass can be mounted in threaded holes on both end faces of the gyro rotor to permit facilitated adjustment of the rotational balance of the gyro rotor.

(g) A keyway is formed in a band-shaped member for defining the coordinate orientation of this gyro.

BRIEF DESCRIPTION OF THE DRAWINGS

FIGS. 2 through 6 illustrate a dynamically tuned gyro in accordance with the present invention, wherein FIG. 2 is a sectional view showing the overall structure of the gyro. FIG. 3 is a sectional view taken along line A—A of FIG. 2. FIG. 4 is a sectional view taken along line B—B in FIG. 2. FIG. 5 is a sectional view taken along line C—C in FIG. 2. FIG. 6 is an exploded perspective view showing essential parts shown in FIG. 2.

DESCRIPTION OF THE PREFERRED EMBODIMENT

Figure 1:
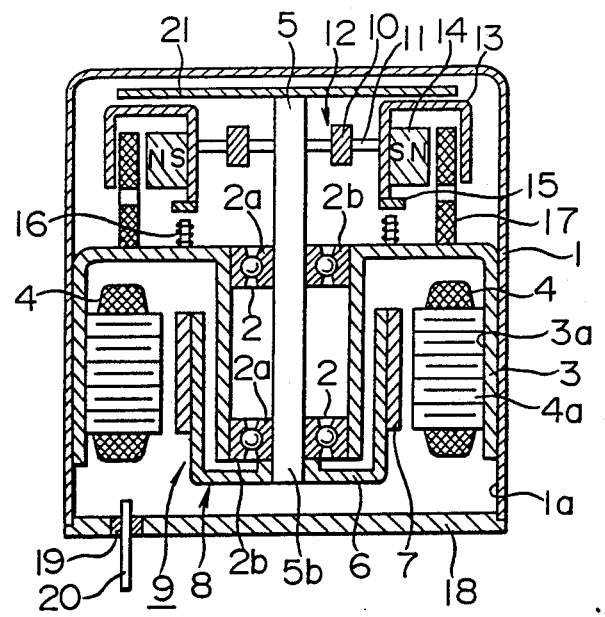
FIG. 1 is a sectional view showing my prior dynamically tuned gyro.

A preferred embodiment of the dynamically tuned gyro according to the present invention will be explained hereinbelow with reference to the accompanying drawings, wherein the parts same as or equivalent to those of the above described prior device are depicted by the same reference numerals.

In the drawings, the numeral 1 designates a casing comprised of a first tubular casing portion 1b and a second tubular casing portion 1c joined to the casing portion 1b. A band-shaped member 22 having a keyway 22a is provided around the outer periphery of casing 1 over the annular joint 1d between the two contiguous casing portions 1b and 1c for providing a unitary structure of the casing 1. Further, the coordinate orientation of the gyro is determined by using said keyway.

A pair of bearings 2 such as gas or ball bearings, are mounted on an inner surface 1a of the casing 1 at some distance from each other. An outer ring 2b of each of the bearings 2 is joined to the casing 1, while a hollow tubular hysteresis ring 5 of a magnetic material used as a rotor and rotary shaft is rotatably mounted on an inner ring 2a of each of the bearings 2.

A stator 4a having a stator winding 4 is provided to the inner surface of the casing 1. The casing portions 1b and 1c making up the casing 1 are mounted by a force fit joint to the outer periphery of the stator 4a, the hollow hysteresis ring 5 and the stator 4a making up a spin motor 9.

Figure 5:
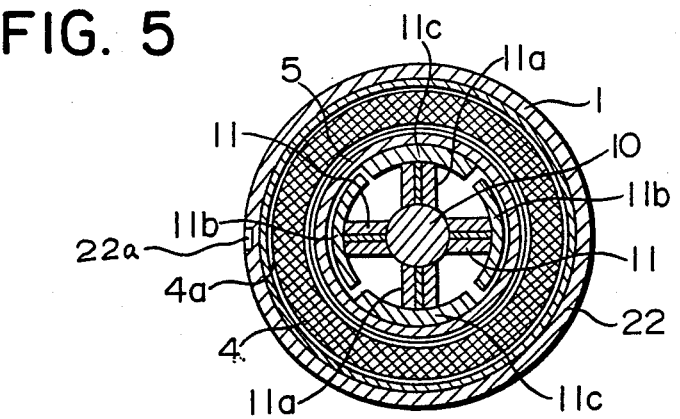

In the hollow interior of the hollow hysteresis ring 5, there are provided a hinge unit 12 comprised of a gimbal 10, first hinges 11, second hinges 11a, first hinge pieces 11b and second hinge pieces 11c and a columnar-shaped gyro rotor 13 comprised of a first rotor member 13a and a second rotor member 13b. The outer periphery of each of the second hinge pieces 11c is secured to the inner periphery of the hollow hysteresis ring 5, as shown in the cross-sectional view of FIG. 5.

The second hinge pieces 11c and the gimbal 10 are connected resiliently to one another by the second hinges 11a. The first hinges 11 mounted on the outer periphery of the gimbal 10 in a direction orthogonal to the second hinges 11a are connected to the respective first hinge pieces 11b.

Figure 6:
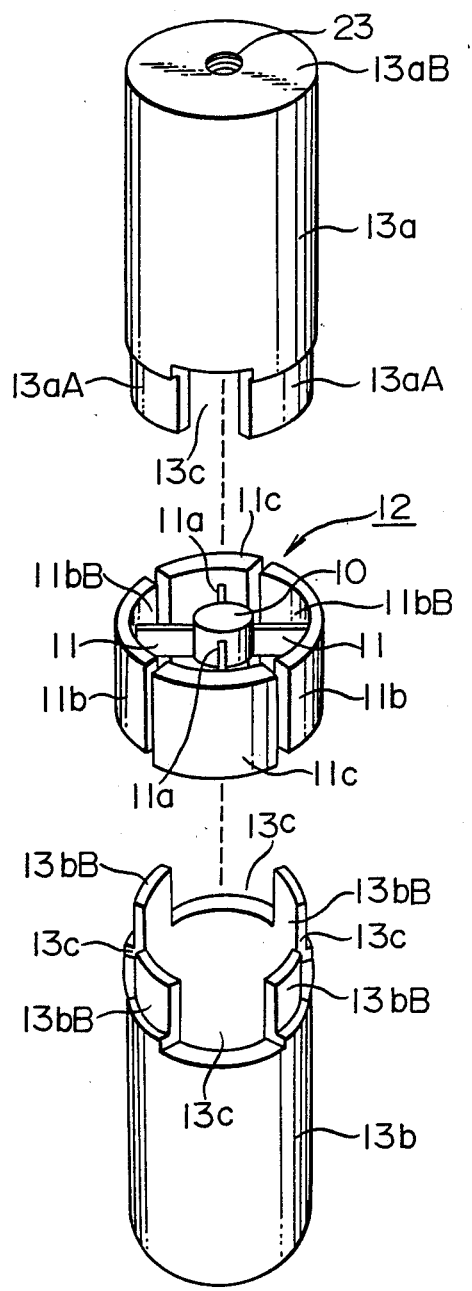

As shown in FIG. 6, the rotor members 13a and 13b are secured coaxially by a press fit to opposite ends of the hinge unit 12. Tongues 13aA of the first rotor member 13a and tongues 13bB of the second rotor member 13b are fitted within the radially inner surfaces 11bB of the first hinge pieces 11b. There are also formed grooves 13c between adjacent ones of the first hinge pieces 13aA and 13bB for avoiding contact with the hinges 11 and 11a.

The rotor members 13a and 13b are formed with central recesses 13d for avoiding contact with the gimbal 10. A threaded hole 23 is provided centrally of an end face 13aB of the first rotor member 13a. A screw, not shown, having a suitable mass is threaded to the threaded hole 23 for assuring rotational balance of the gyro rotor 13.

A sensor ring 15 is provided secured to the outer periphery of the first rotor member 13a near the end face of the member 13a, while a sensor coil 16 is provided secured to the inner periphery of the first casing portion 1b for facing the sensor ring 15.

A pair of ring magnets 14 are mounted on the lower outer periphery of the second rotor member 13b with an axial spacing from each other. These magnets are magnetized along the axial direction. A plurality of ring-shaped torquer coils 17 provided secured to the inner periphery of the second casing portion 1c are mounted between the ring-shaped magnets 14.

An auxiliary rotor 13e to which the ring magnets 14 are provided secured is formed separately from the second rotor member 13b and formed with a threaded hole 23 similar to the threaded hole in the first rotor member 13a. It is not essential that the auxiliary rotor 13e be provided separately from the rotor member 13a, as shown in FIG. 2, but a similar effect can also be obtained when the auxiliary rotor is formed integrally with the rotor member.

A lid 24 is provided at the upper end of the casing 1, and a terminal board 18 is mounted at the lower end of the casing 1. A terminal 20 is mounted in the board 18 by way of an insulating section 19.

The dynamically tuned gyro of the present invention, described as above, operates in the following manner.

Figure 2:
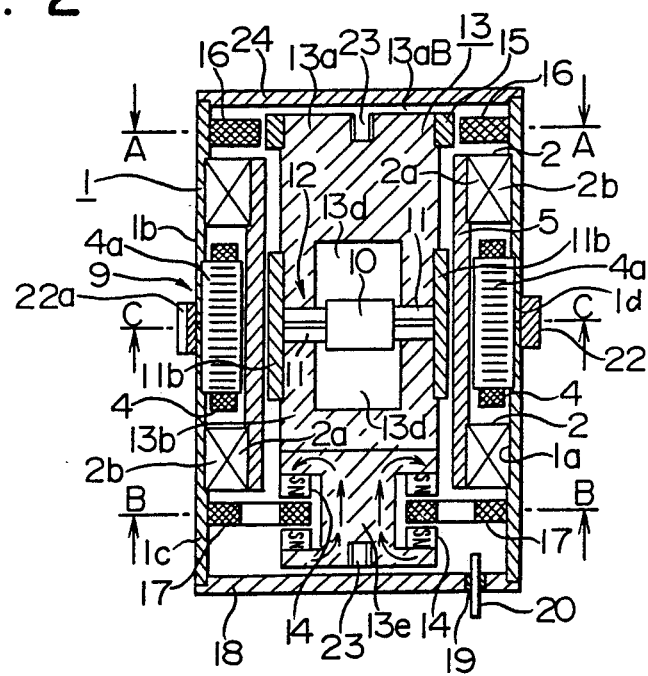
Figure 3:
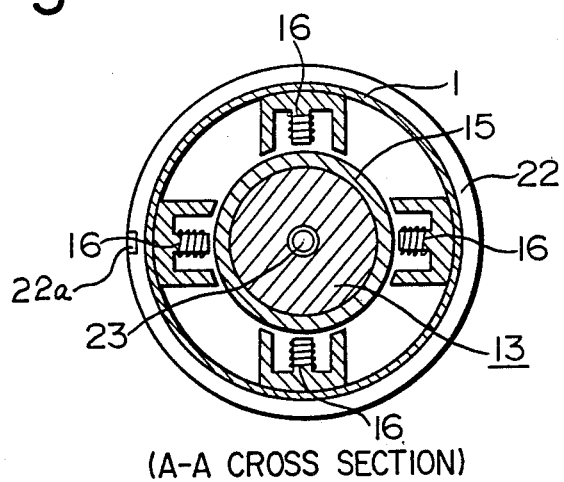
Figure 4:
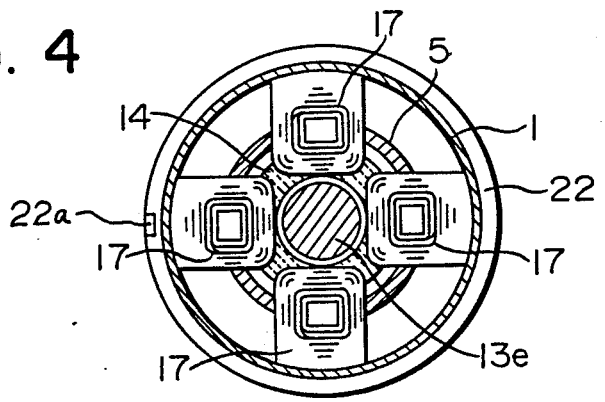

When the spin motor 9 is actuated in the state of FIG. 2, the hollow hysteresis ring 5 is driven into high-speed rotation, such that the gyro rotor 13 is driven into high-speed rotation by the intermediary of the hinge unit 12.

When the gyro rotor 13 is tilted, the tilted state of the gyro rotor 13 is sensed by the sensor coil 16, such that a required amount of control current is supplied to the torquer coil 17. Thus a force proportionate to the product of the magnetic fluxes in the gyro rotor 13 and the ring magnets 14 and the control current in the torquer coil 17 is induced for effecting a required positional control of the gyro rotor 13.

It should be noted that a stop operation is achieved at the time of tilting of the gyro rotor 13 by providing a predetermined gap between the inner periphery of the hollow hysteresis ring 5 and the outer periphery of the gyro rotor 13.

What is claimed is:

1. A dynamically tuned gyro comprising in combination a cylindrical hysteresis ring mounted for rotation about its longitudinal axis within a cylindrical casing having a radially inner wall, said ring being joined to said casing wall by a pair of axially spaced apart bearings concentric with said ring, a stator for cooperating with said hysteresis ring to provide a spin motor, said stator being mounted within said casing axially between said bearings and radially between said hysteresis ring and said casing operatively spaced from said ring, a cylindrical gyro rotor having first and second ends and mounted through a hinge unit within said hysteresis ring with a predetermined radial gap therebetween, said gap being selected to determine the permitted range of tilting of said gyro rotor, a sensor ring mounted on said gyro rotor adjacent said first end of said rotor, a pair of axially spaced apart ring magnets mounted on said gyro rotor adjacent said second end of said rotor, a sensor coil mounted on said wall of said casing confronting in operative relation said sensor ring, and a torquer coil mounted on said wall of said casing confronting in operative fashion said ring magnets.

2. A dynamically tuned gyro according to claim 1, wherein said casing consists of two contiguous axial portions with a band member encircling the casing about the juncture between said two casing portions.

3. A dynamically tuned gyro according to claim 1, wherein a threaded hole is provided in each of said first and second ends of said gyro rotor, and a screw of predetermined mass is threadedly disposed in each of said threaded holes for balancing rotation of said gyro rotor.

4. A dynamically tuned gyro according to claim 3, wherein said casing consists of two contiguous axial portions with a band member encircling the casing about the juncture between said two casing portions.

5. A dynamically tuned gyro according to claim 4, wherein a keyway of U-shape cross-section is formed in said band member.

6. A dynamically tuned gyro according to claim 1, wherein said ring magnets are mounted on an end portion of said gyro rotor that in axial cross-section is substantially I-shape, said ring magnets being magnetized in the axial direction, and wherein said torquer coil comprises four ring members disposed equi-distantly circumferentially around said ring magnets projecting from said casing wall into the space between said ring magnets.

* * * * *

UNITED STATES PATENT AND TRADEMARK OFFICE
CERTIFICATE OF CORRECTION

PATENT NO. : 4,891,997

DATED : January 9, 1990

INVENTOR(S) : S. Hayashi

It is certified that error appears in the above-identified patent and that said Letters Patent is hereby corrected as shown below:

Col. 1, line 38, after "is" insert --provided--; line 45, after "is" insert --provided--; line 49 after "is" insert --provided--;

Col. 2, line 27, after "the" (second occurrence) insert --device of Fig. 1--;

Col. 3, line 2, "adapted" should read --adopted--; line 65, delete "provided", insert --joined--;

Col. 6, line 2, delete "fashion", insert --relation--

Signed and Sealed this

Thirtieth Day of July, 1991

*Attest:*

HARRY F. MANBECK, JR.

*Attesting Officer*     *Commissioner of Patents and Trademarks*